United States Patent
Cheung

(10) Patent No.: US 9,209,911 B2
(45) Date of Patent: Dec. 8, 2015

(54) RADIO WITH A SWITCHED MODE POWER SUPPLY

(71) Applicant: Kam Chow Cheung, Fotan (HK)

(72) Inventor: Kam Chow Cheung, Fotan (HK)

( * ) Notice: Subject to any disclaimer, the term of this patent is extended or adjusted under 35 U.S.C. 154(b) by 4 days.

(21) Appl. No.: 14/063,921

(22) Filed: Oct. 25, 2013

(65) Prior Publication Data

US 2015/0118982 A1    Apr. 30, 2015

(51) Int. Cl.
| | |
|---|---|
| H04B 1/10 | (2006.01) |
| H04B 15/02 | (2006.01) |
| H04B 1/16 | (2006.01) |
| H04B 15/04 | (2006.01) |

(52) U.S. Cl.
CPC ............. *H04B 15/02* (2013.01); *H04B 1/1607* (2013.01); *H04B 1/1646* (2013.01); *H04B 15/04* (2013.01)

(58) Field of Classification Search
CPC .......... H04B 2215/069; H04B 1/1607; H04B 1/1615
USPC ......................................... 455/298, 299, 296
See application file for complete search history.

(56) References Cited

U.S. PATENT DOCUMENTS

| | | |
|---|---|---|
| 5,537,305 A | 7/1996 | Colotti |
| 2007/0191073 A1 | 8/2007 | May et al. |
| 2009/0015215 A1* | 1/2009 | Ajram et al. ................... 323/234 |

OTHER PUBLICATIONS

Extended European Search Report dated Mar. 16, 2015, for corresponding EP Application No. 14190144.7-1852, 6 pages.

\* cited by examiner

*Primary Examiner* — Nguyen Vo
(74) *Attorney, Agent, or Firm* — Seed IP Law Group PLLC

(57) ABSTRACT

A radio including a switched mode power supply configured to shift its operating frequency to a frequency which alleviates electromagnetic interference with a radio frequency to which the radio is or will be tuned.

30 Claims, 17 Drawing Sheets

| Multiple | AM BAND as example. Table of f0, f1, f2 in (khz) and its harmonics. | | |
| --- | --- | --- | --- |
| 1 | 65 | 67 | 69 |
| 2 | 130 | 134 | 138 |
| 3 | 195 | 201 | 207 |
| 4 | 260 | 268 | 276 |
| 5 | 325 | 335 | 345 |
| 6 | 390 | 402 | 414 |
| 7 | 455 | 469 | 483 |
| 8 | 520 | 536 | 552 |
| 9 | 585 | 603 | 621 |
| 10 | 650 | 670 | 690 |
| 11 | 715 | 737 | 759 |
| 12 | 780 | 804 | 828 |
| 13 | 845 | 871 | 897 |
| 14 | 910 | 938 | 966 |
| 15 | 975 | 1005 | 1035 |
| 16 | 1040 | 1072 | 1104 |
| 17 | 1105 | 1139 | 1173 |
| 18 | 1170 | 1206 | 1242 |
| 19 | 1235 | 1273 | 1311 |
| 20 | 1300 | 1340 | 1380 |
| 21 | 1365 | 1407 | 1449 |
| 22 | 1430 | 1474 | 1518 |
| 23 | 1495 | 1541 | 1587 |
| 24 | 1560 | 1608 | 1656 |
| 25 | 1625 | 1675 | 1725 |
| 26 | 1690 | 1742 | 1794 |
| ... | ... | ... | ... |

*FIG. 4*

RADIO WITH A SWITCHED MODE POWER SUPPLY

TECHNICAL FIELD

The present invention relates to the field of radios and in particular portable type AM/FM radio devices designed for use on construction worksites and the like.

BACKGROUND OF THE INVENTION

Certain types of portable AM/FM radios are designed specifically to cope with harsh environmental conditions at construction work sites and the like. Such "worksite" type radios may typically be driven by a switched mode power supply with a relatively higher power rating than traditional household radios so as to enable audio to be broadcast through the speakers across a wider and/or noisier (typically outdoors) worksite environment. It is also generally required that the switched mode power supply has a higher power rating than traditional household radios so that it can be used to charge up worksite power tools via an output power jack on the radio.

One problem with worksite type radios is that the switched mode power supply tends to generate electromagnetic radiation which interferes with and degrades operation of the radio tuning circuit and hence the quality of audio that is output by the radio. The extent of the interference increases proportionally with the power rating of the switched mode power supply. In seeking to address this problem, electromagnetic shielding has been used in certain worksite radios to reduce the tuning circuit's exposure to the effects of electromagnetic interference. However this approach has limitations as electromagnetic radiation may still travel through connection cables of the switched mode power supply resulting in interference with neighbouring electronics including the tuning circuit. Alternatively, attempts have been made to utilise power supplies comprising linear transformers which work on AC-line frequencies of 50/60 Hz as they do not tend to generate electromagnetic radiation that interferes with the AM/FM radio spectrum. Unfortunately, these AC-line type power supplies have relatively poor power efficiency compared to a switched mode power supplies, and, the size and weight of the linear transformer in the AC-line type power supply required to provide suitable power rating of the worksite type radio needs to be relatively large and heavy.

SUMMARY OF THE INVENTION

The present invention seeks to alleviate at least one of the above-described problems.

The present invention may involve several broad forms. Embodiments of the present invention may include one or any combination of the different broad forms herein described.

In a first broad form the present invention provides a radio including a switched mode power supply configured to shift its operating frequency to a frequency which alleviates electromagnetic interference with a radio frequency to which the radio is or will be tuned.

Preferably, the present invention may include a detector for detecting the radio frequency to which the radio is or will be tuned whereby the switched mode power supply is configured to shift its operating frequency by reference to the radio frequency to which the radio is or will be tuned. Typically, the detector may include a microcontroller of the radio.

Typically, the switched mode power supply may include a pulse width modulation switching circuit which controls the operating frequency of the switched mode power supply, wherein the operating frequency of the switched mode power supply may be shifted by adjusting an operating characteristic of the pulse width modulation switching circuit.

Preferably, the switched mode power supply may be configured to shift its operating frequency to at least one of a plurality of frequencies which alleviate electromagnetic interference with the radio frequency to which the radio is or will be tuned. Typically, the plurality of frequencies may be programmed in to a lookup table accessible by the switched mode power supply. Typically, the plurality of frequencies may include at least 3 frequencies which alleviate electromagnetic interference with the radio frequency to which the radio is or will be tuned.

Preferably, the radio may include a portable radio.

Preferably, the present invention includes a rechargeable battery, the rechargeable battery being powered by the switched mode power supply, and an output jack via which the rechargeable battery is able to charge-up an external device when electrically connected to the output jack.

In a second broad form the present invention provides a method of operating a radio, the radio including a switched mode power supply and the method including a step of shifting an operating frequency of the switched mode power supply to a frequency which alleviates electromagnetic interference with a radio frequency to which the radio is or will be tuned.

Preferably, the present invention may include a step of detecting the radio frequency to which the radio is or will be tuned before the step of shifting the operating frequency of the switched mode power supply to the frequency which alleviates electromagnetic interference with the detected radio frequency. Typically, the step of detecting the radio frequency to which the radio is or will be tuned may be performed by a microcontroller of the radio.

Typically, the switched mode power supply may include a pulse width modulation switching circuit which controls the operating frequency of the switched mode power supply, and the step of shifting the operating frequency of the switched mode power supply may include adjusting an operating characteristic of the pulse width modulation switching circuit of the switched mode power supply.

Preferably, the step of shifting the operating frequency of the switched mode power supply may include a step of selectably switching the operating frequency to at least one of a plurality of frequencies which alleviate electromagnetic interference with the radio frequency to which the radio is or will be tuned. Typically, the plurality of frequencies may be programmed in to a lookup table accessible by the switched mode power supply. Typically, the plurality of frequencies may include at least 3 frequencies which alleviate electromagnetic interference with the radio frequency to which the radio is or will be tuned.

Preferably, the radio may include a portable radio.

Preferably, the present invention includes a rechargeable battery powered by the switched mode power supply, and, an output jack via which the rechargeable battery is used to charge-up an external device when electrically connected to the output jack.

In a third broad form the present invention provides a switched mode power supply for use in a radio, wherein the switched mode power supply is configured to shift its operating frequency to a frequency which alleviates electromagnetic interference with a radio frequency to which the radio is or will be tuned.

Preferably, the present invention may include a detector for detecting the radio frequency to which the radio is or will be tuned whereby the switched mode power supply is configured to shift its operating frequency by reference to the radio frequency to which the radio is or will be tuned. Typically, the detector may include a microcontroller of the radio.

Typically, the switched mode power supply may include a pulse width modulation switching circuit which controls the operating frequency of the switched mode power supply, wherein the operating frequency of the switched mode power supply may be shifted by adjusting an operating characteristic of the pulse width modulation switching circuit.

Preferably, the switched mode power supply may be configured to shift its operating frequency to at least one of a plurality of frequencies which alleviate electromagnetic interference with the radio frequency to which the radio is or will be tuned. Typically, the plurality of frequencies may be programmed in to a lookup table accessible by the switched mode power supply. Typically, the plurality of frequencies may include at least 3 frequencies which alleviate electromagnetic interference with the radio frequency to which the radio is or will be tuned.

Preferably, the radio may include a portable radio.

Preferably, the present invention includes a rechargeable battery, the rechargeable battery being powered by the switched mode power supply, and an output jack via which the rechargeable battery is able to charge-up an external device when electrically connected to the output jack.

In a fourth broad form the present invention provides a method of operating a switched mode power supply for use in a radio, the method including a step of shifting an operating frequency of the switched mode power supply to a frequency which alleviates electromagnetic interference with a radio frequency to which the radio is or will be tuned.

Preferably, the present invention may include a step of detecting the radio frequency to which the radio is or will be tuned before the step of shifting the operating frequency of the switched mode power supply to the frequency which alleviates electromagnetic interference with the detected radio frequency. Typically, the step of detecting the radio frequency to which the radio is or will be tuned may be performed by a microcontroller of the radio.

Typically, the switched mode power supply may include a pulse width modulation switching circuit which controls the operating frequency of the switched mode power supply, and the step of shifting the operating frequency of the switched mode power supply may include adjusting an operating characteristic of the pulse width modulation switching circuit of the switched mode power supply.

Preferably, the step of shifting the operating frequency of the switched mode power supply may include a step of selectably switching the operating frequency to at least one of a plurality of frequencies which alleviate electromagnetic interference with the radio frequency to which the radio is or will be tuned. Typically, the plurality of frequencies may be programmed in to a lookup table accessible by the switched mode power supply. Typically, the plurality of frequencies may include at least 3 frequencies which alleviate electromagnetic interference with the radio frequency to which the radio is or will be tuned.

Preferably, the radio may include a portable radio.

Preferably, the present invention includes a rechargeable battery powered by the switched mode power supply, and, an output jack via which the rechargeable battery is used to charge-up an external device when electrically connected to the output jack.

Advantageously, the present invention provides a worksite type radio with a switched mode power supply which is of suitable weight, size and power rating to not only power the worksite type radio but also to power a rechargeable battery unit for charging power tools and the like.

BRIEF DESCRIPTION OF THE DRAWINGS

The present invention will become more fully understood from the following detailed description of a preferred but non-limiting embodiment thereof, described in connection with the accompanying drawings, wherein:

FIG. 4 shows an exemplary operating frequency lookup table used in accordance with embodiments of the present invention.

DETAILED DESCRIPTION OF PREFERRED EMBODIMENTS

Figure 1:
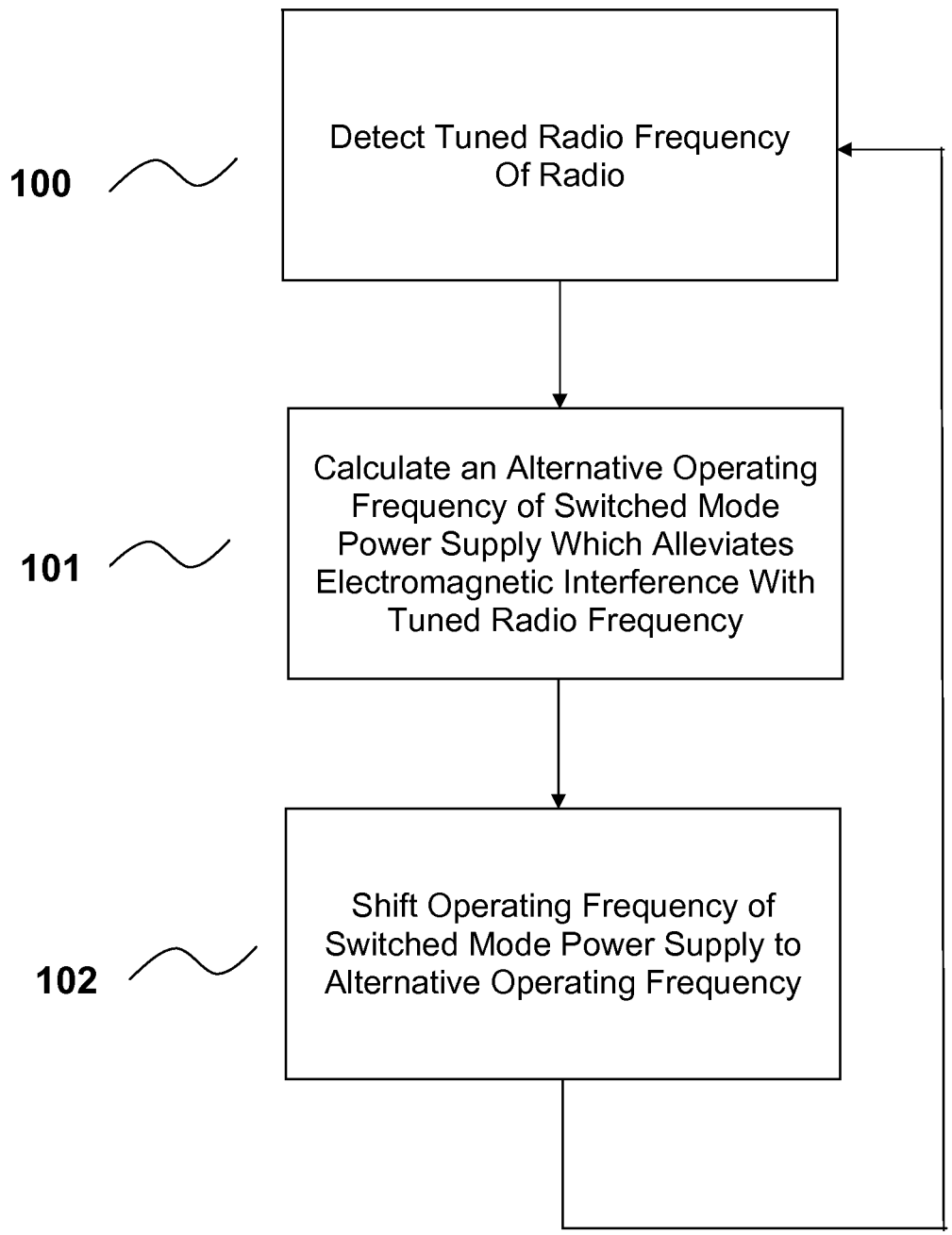
FIG. 1 shows a flow diagram of method steps in accordance with an embodiment of the present invention.

A preferred embodiment of the present invention will now be described herein with reference to FIGS. 1 to 4 in the drawings. The preferred embodiment includes a worksite type radio (FIG. 1) having a radio receiver (202) connected to a radio microcontroller (200) which is configured for tuning the radio to a given AM/FM radio frequency received via the radio receiver (202). The radio also includes a liquid crystal display (201) connected to an output of the radio microcontroller (200) for displaying information such as the tuned radio frequency, and, a power amplifier (203) and speaker (204) assembly via which audio can be output from the radio.

The radio also includes a switched mode power supply (206) for powering the radio with a power ratio in the range of 200-300 W. The switched mode power supply (206) provides regulated DC voltage from an AC line mains supply. The AC mains supply is filtered by an AC line electromagnetic interference filter (209) and is rectified by a bridge rectifier (210) before being fed into the switched mode power supply (206) which performs high frequency switching using a MOSFET to produce a relatively constant DC supply. The high frequency switching of the DC signal is output across the primary coil of a high frequency transformer such that a voltage pulse train of suitable magnitude and duty ratio appears on a secondary coil of the transformer. A pulse width modulation switching circuit (206) of the switched mode power supply (206) is configurable for controlling an operating frequency (i.e. the frequency of drive pulses) of the switched mode power supply (206). The operating frequency of the switched mode power supply (206) can be shifted by adjusting operating characteristics of the by pulse width modulation switching circuit (206).

The radio also includes a rechargeable battery unit (208) disposed internally of the radio. Conveniently, the radio includes an output jack via which power tools or other electrical equipment may plugged in to draw power from the rechargeable battery unit (208) so as to charge up the equipment. The rechargeable battery unit (208) is also powered by the same switched mode power supply (206) as is used to power the radio.

Figure 2:
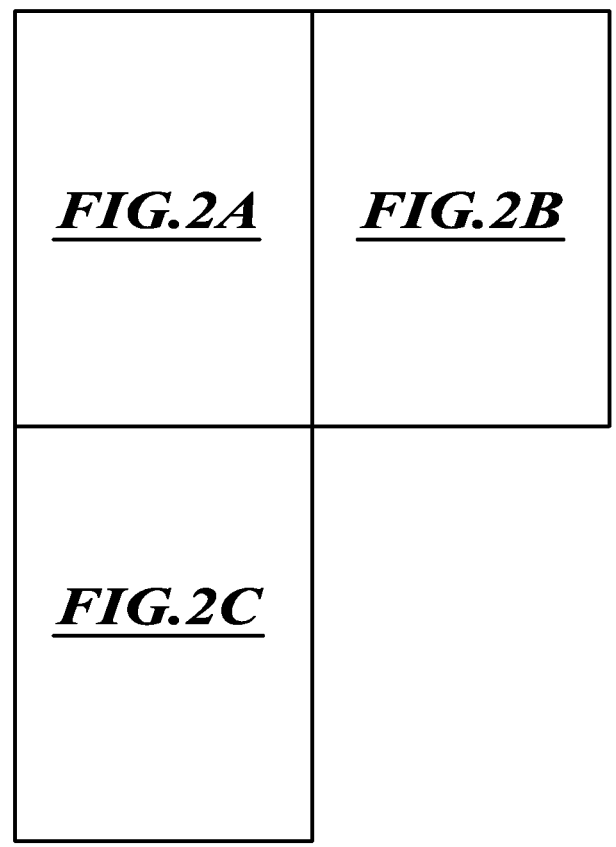
FIG. 2 is a map illustrating the relative positions of drawing sheets FIGS. 2A-2C.
Figure 2A:
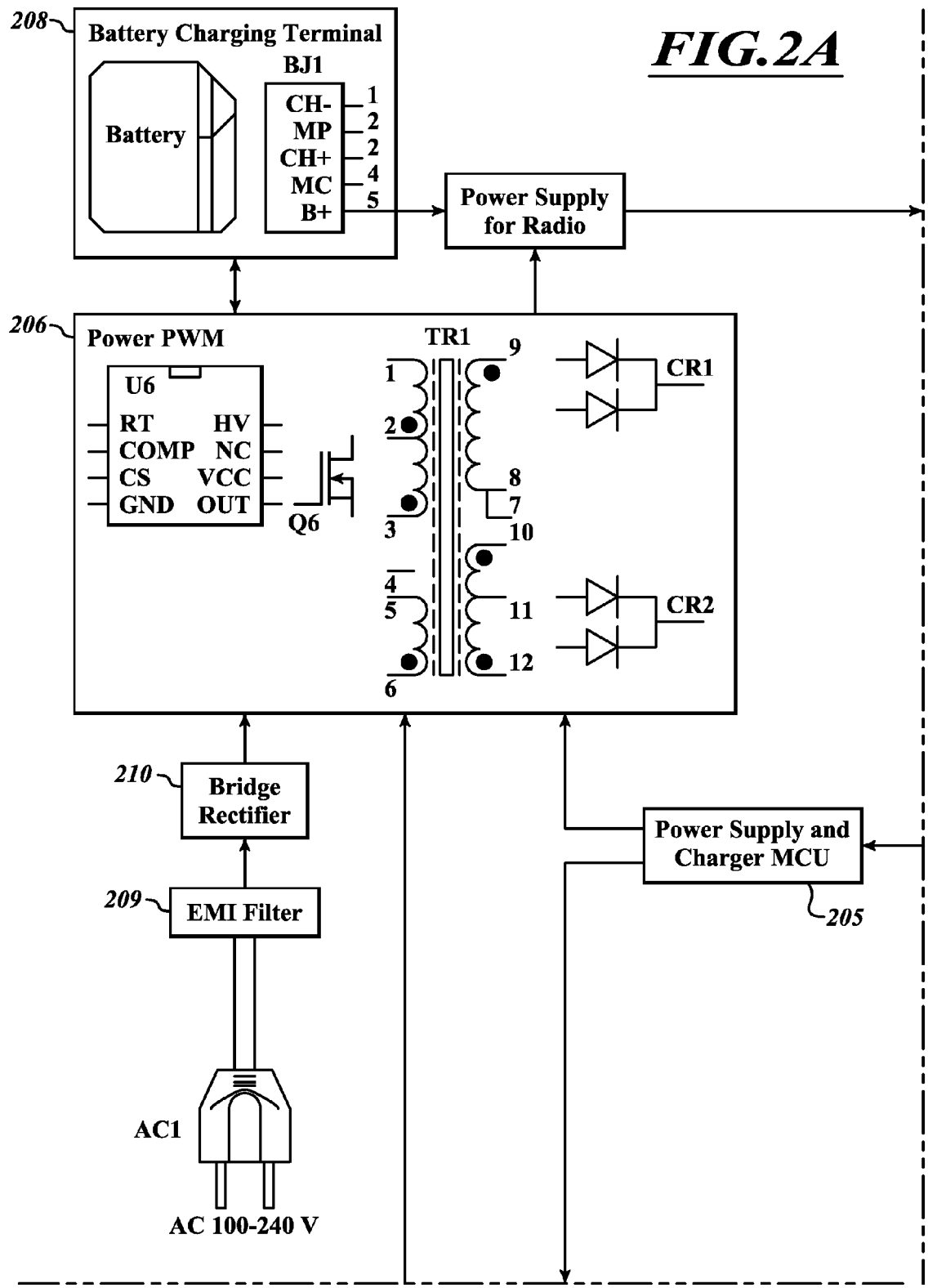
FIGS. 2A-2C are a functional block diagram of a radio in accordance with an embodiment of the present invention
Figure 2B:
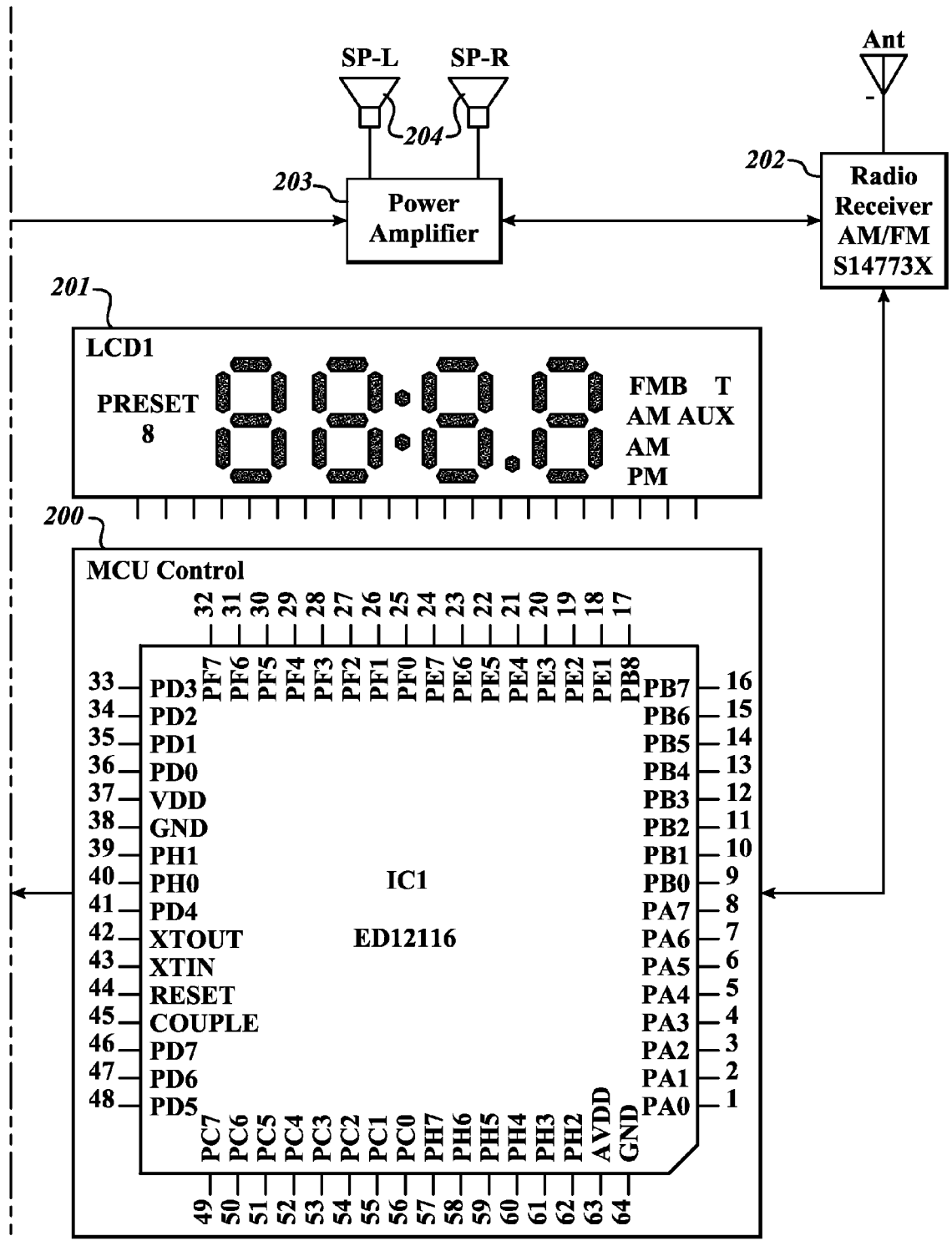
Figure 2C:
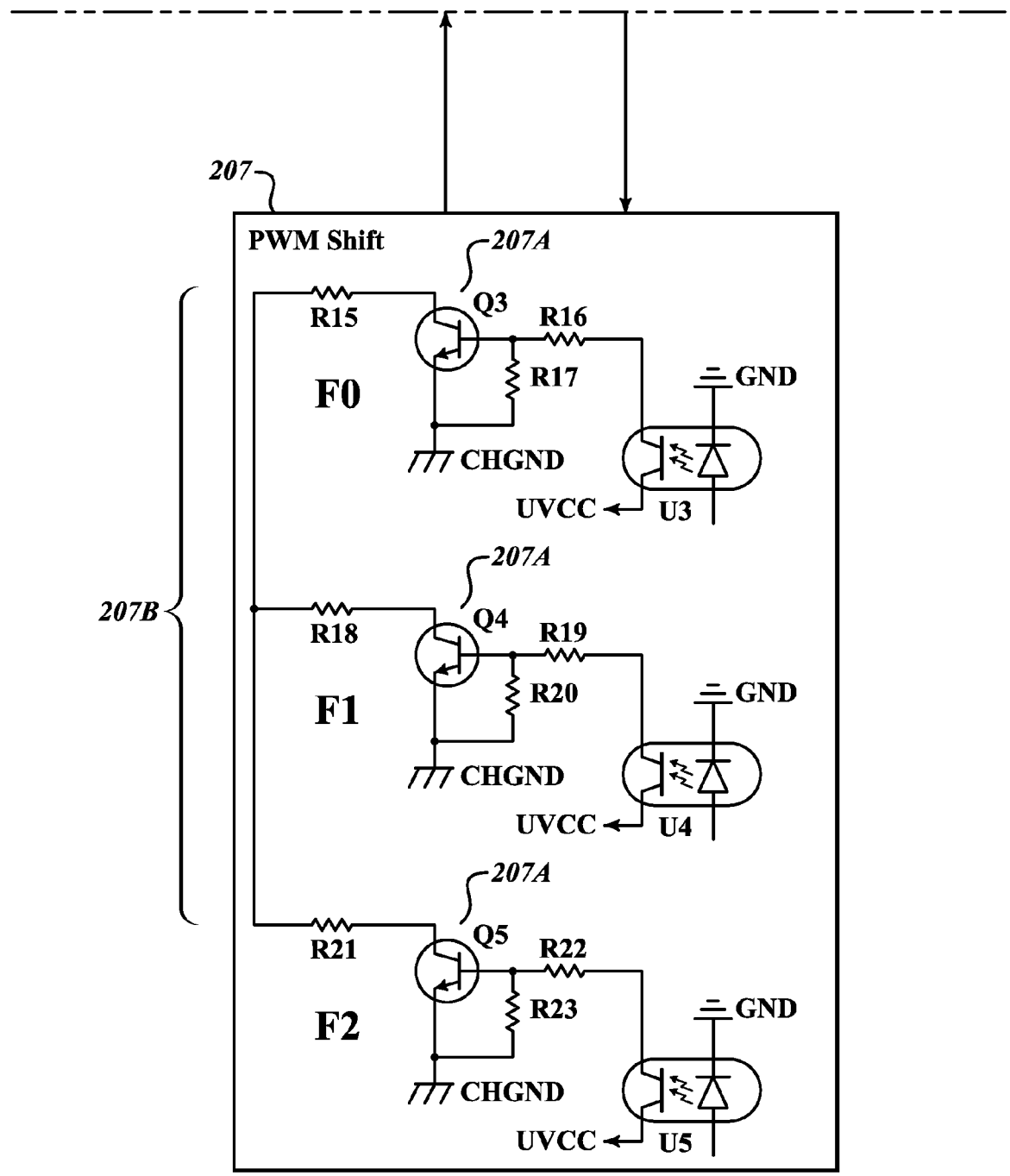
Figure 3:
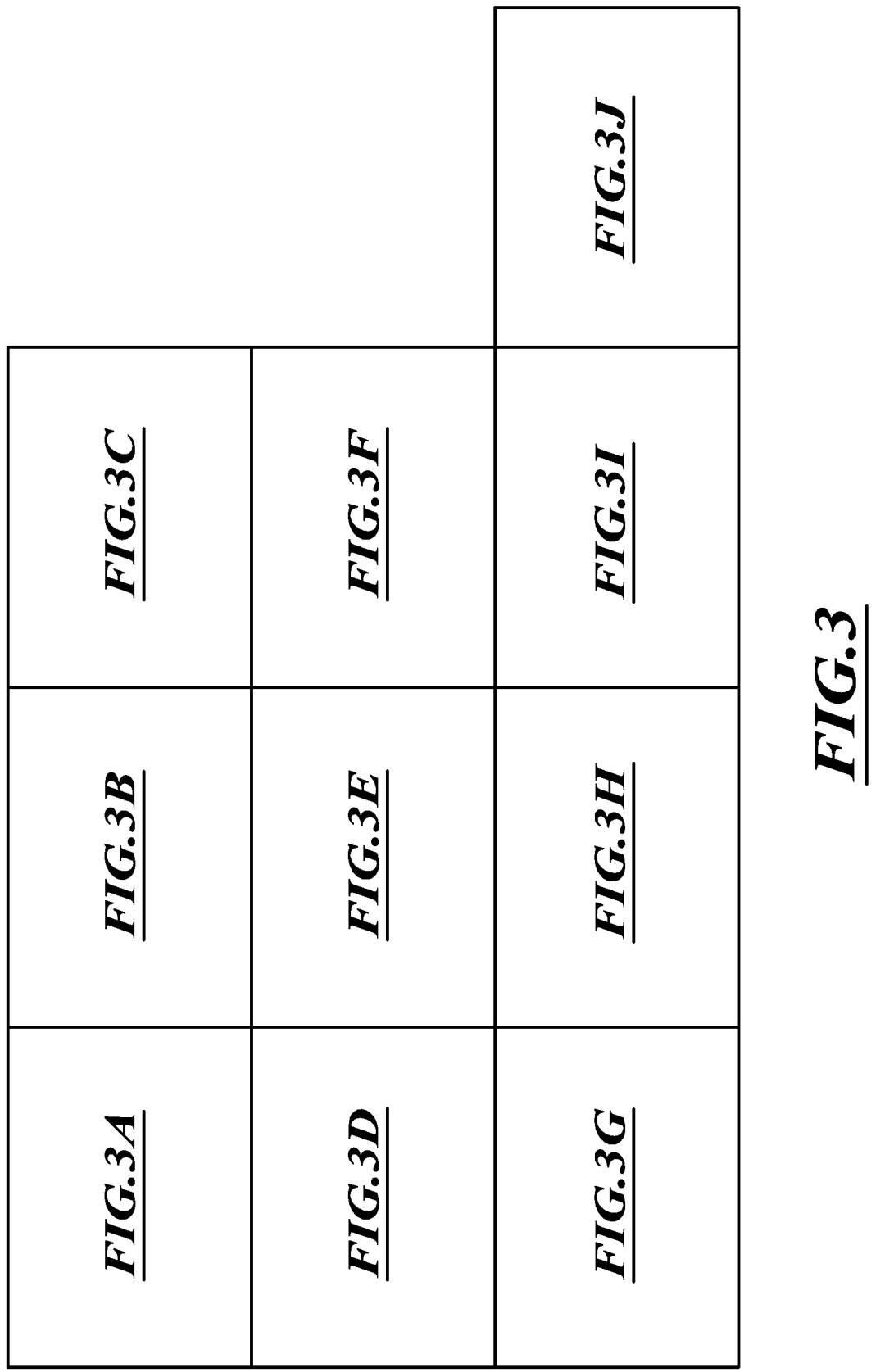
FIG. 3 is a map illustrating the relative positions of drawing sheets FIGS. 3A-3J.
Figure 3A:
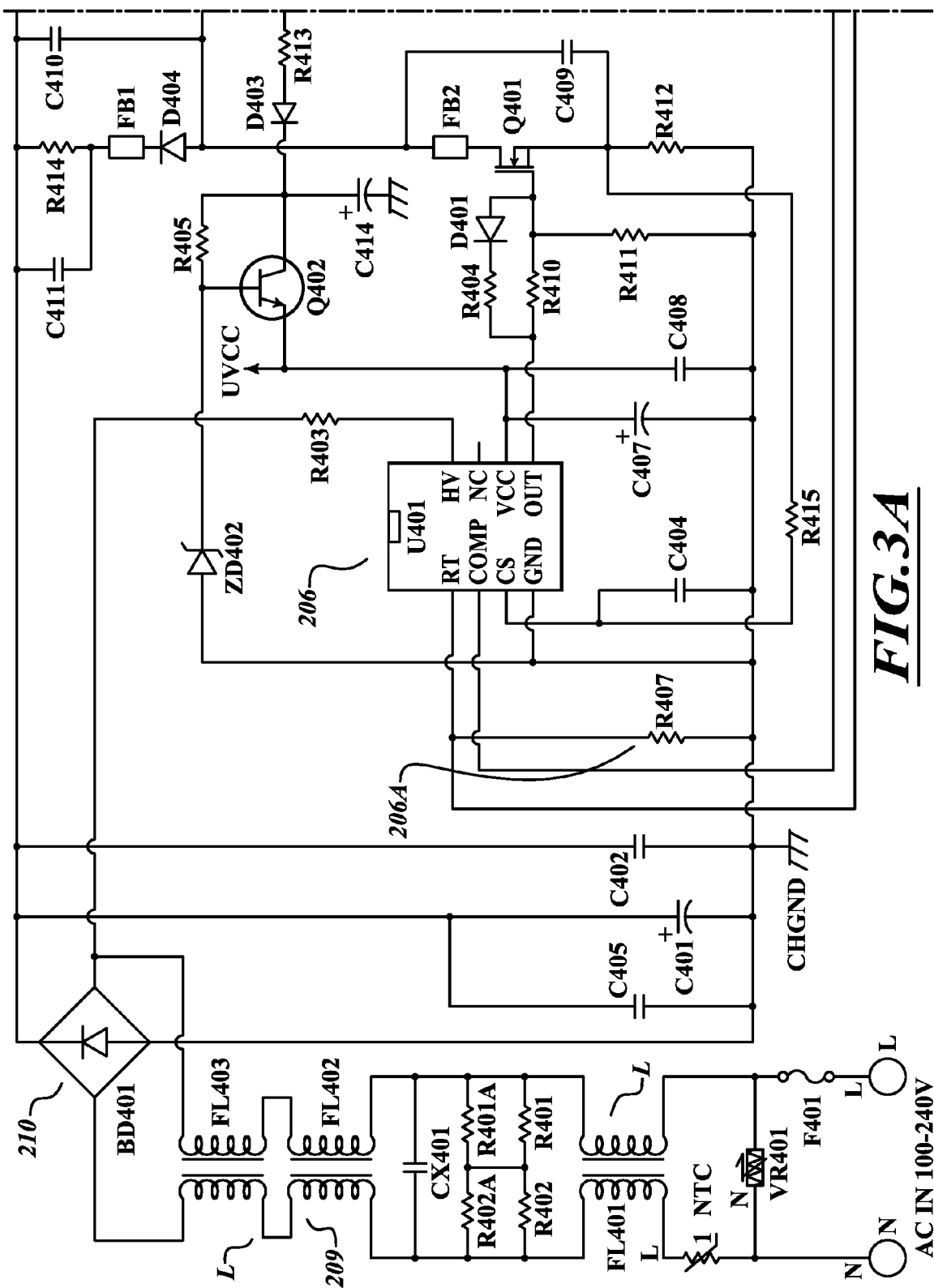
FIGS. 3A-3J is a schematic diagram of circuitry of a radio in accordance with an embodiment of the present invention.
Figure 3B:
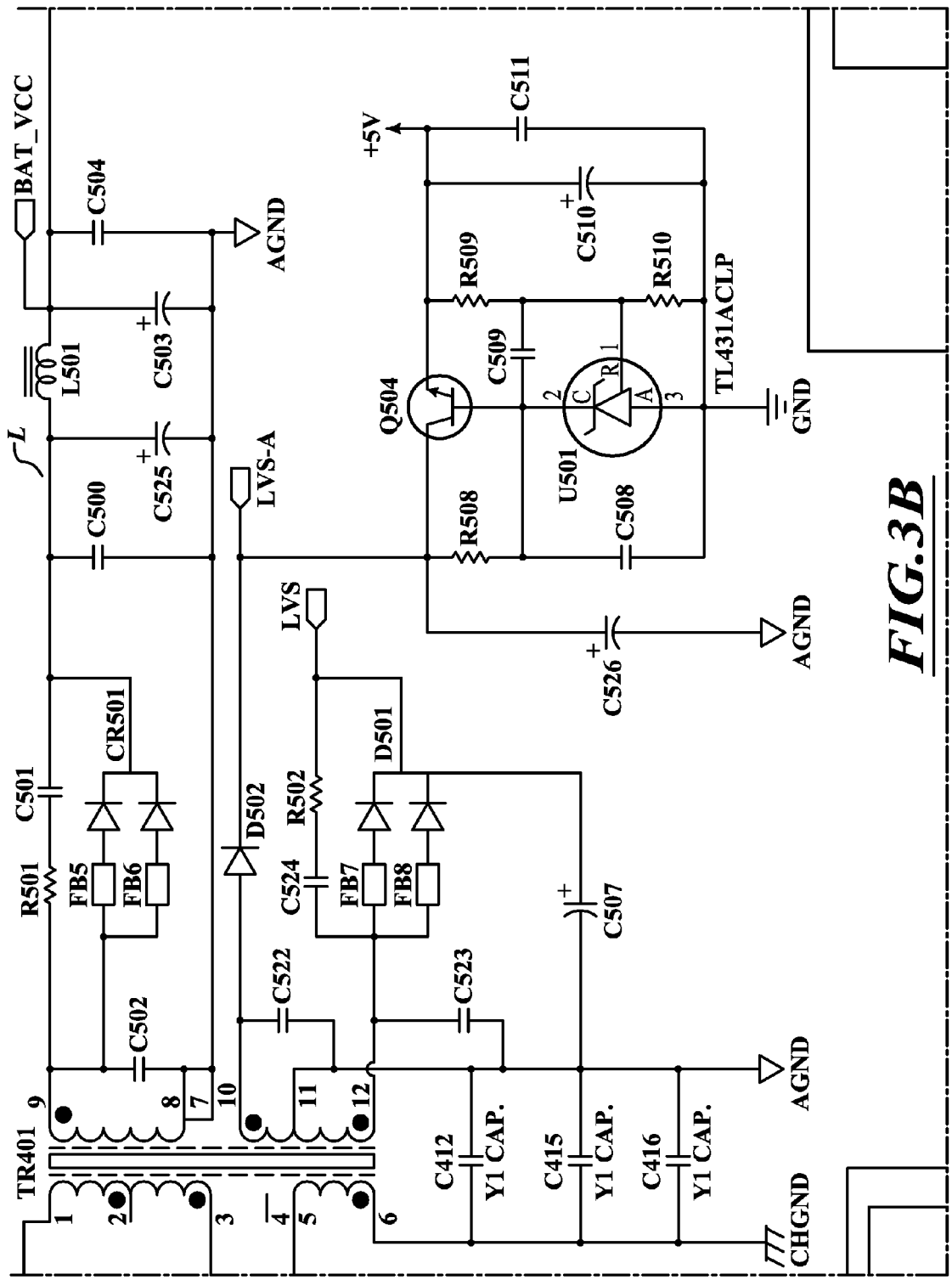
Figure 3C:
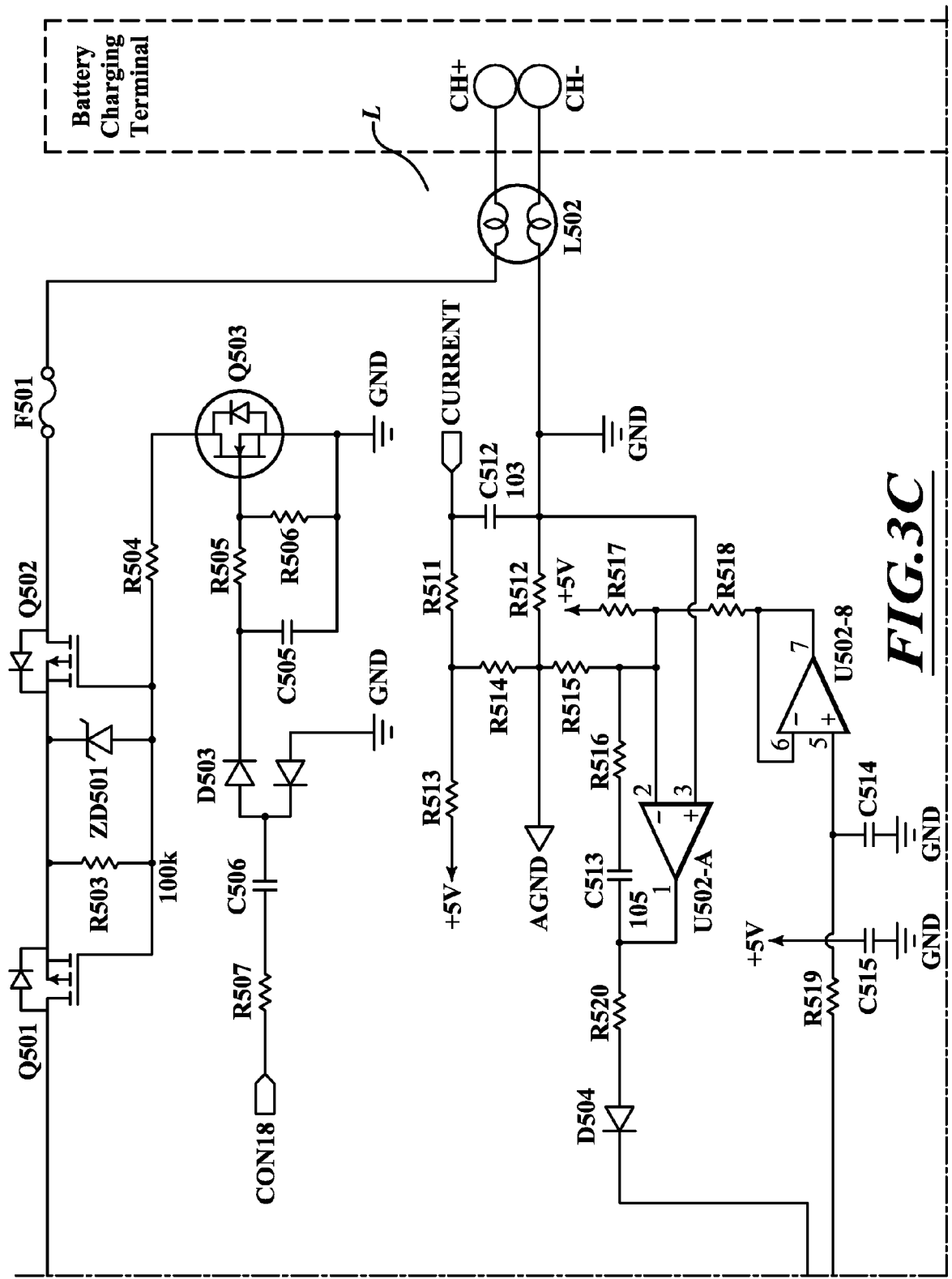
Figure 3D:
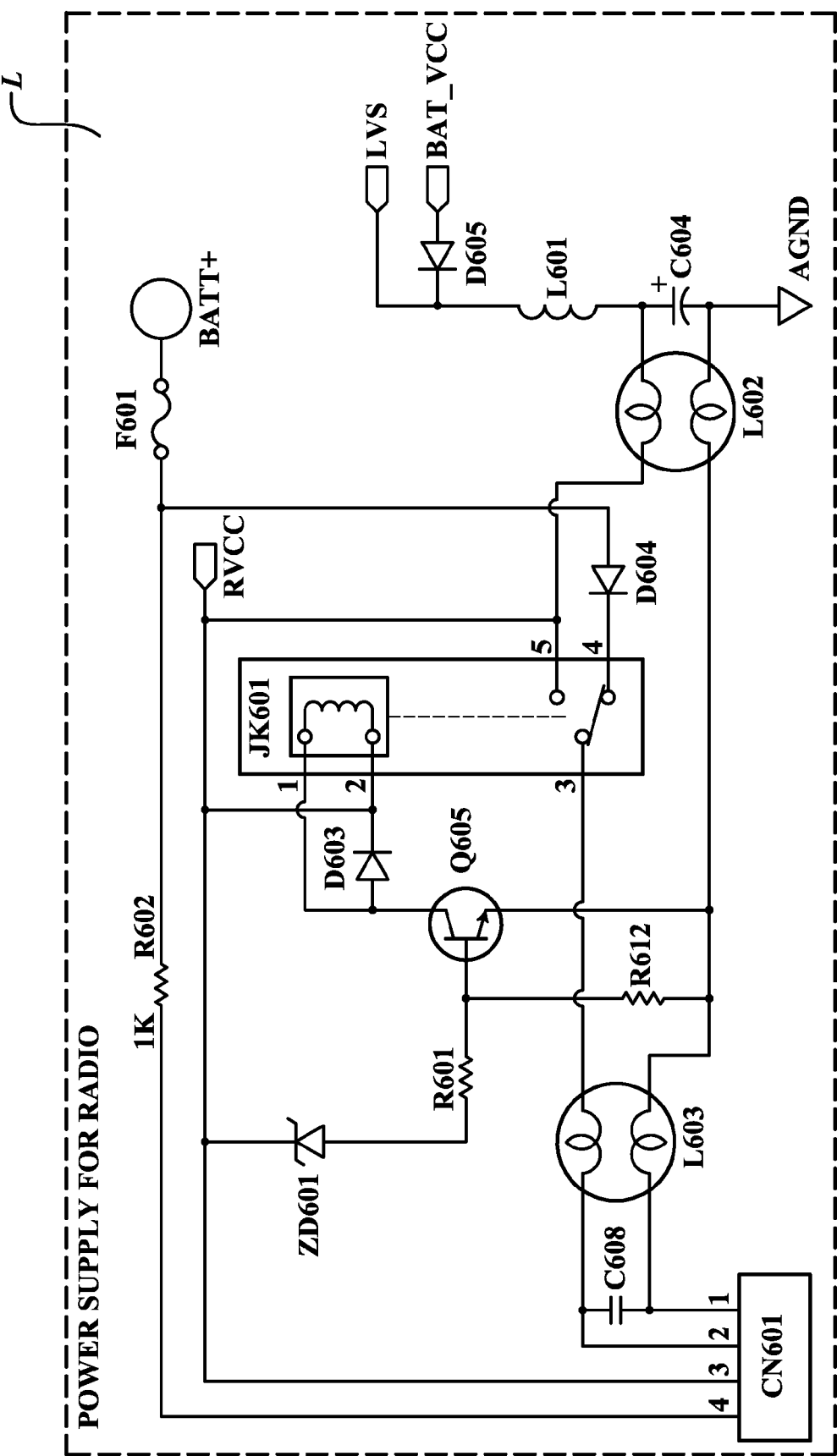
Figure 3E:
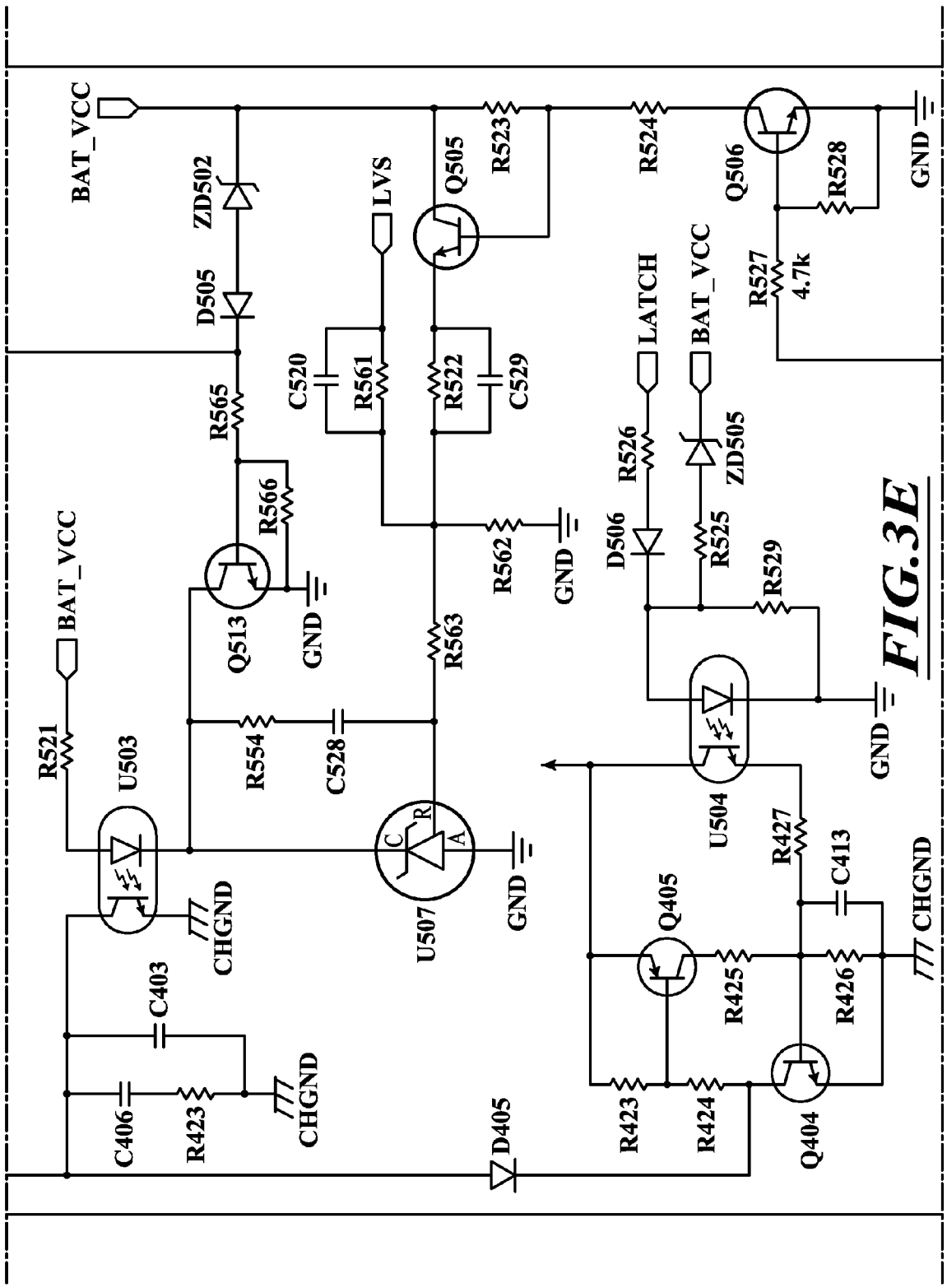
Figure 3F:
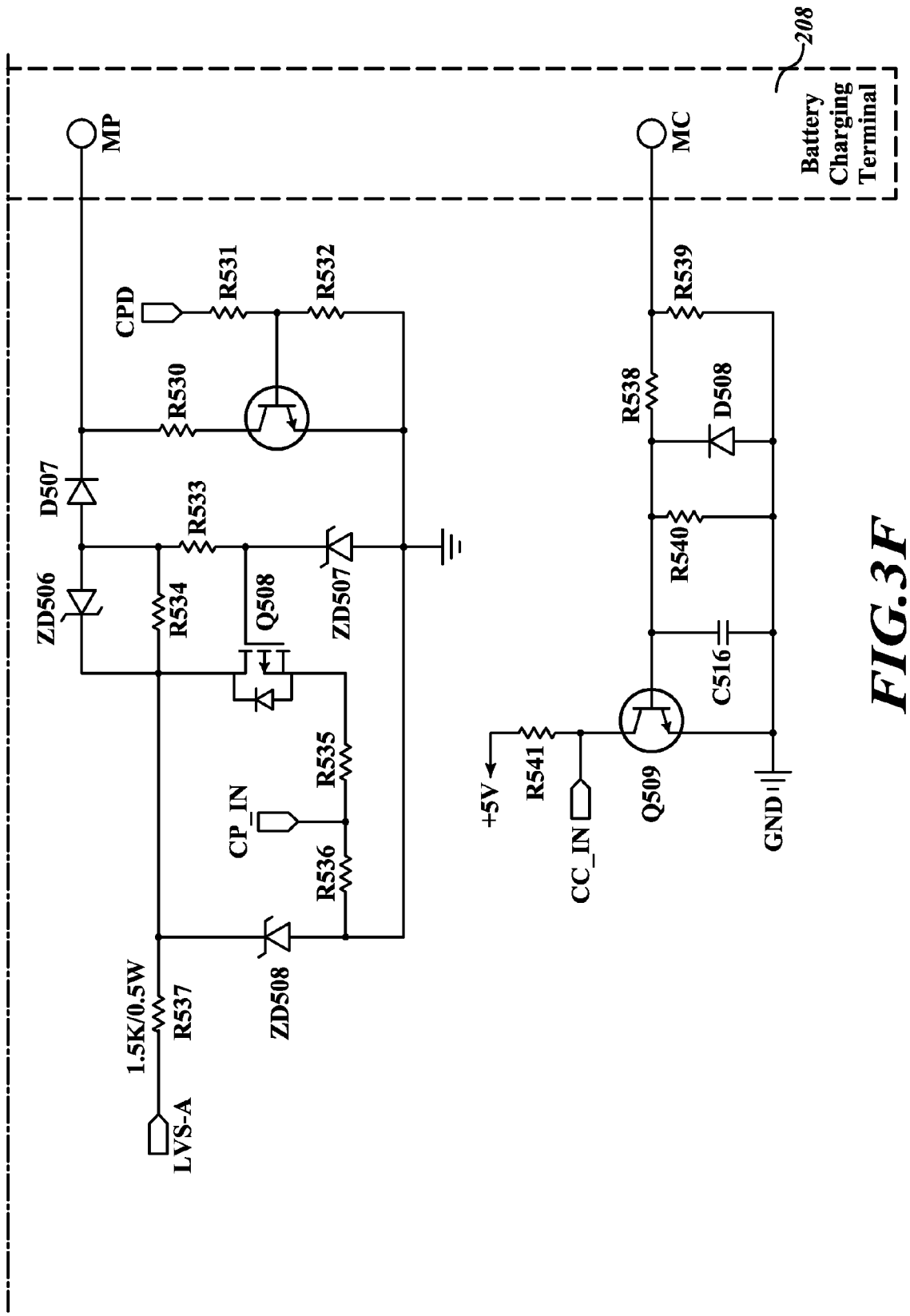
Figure 3G:
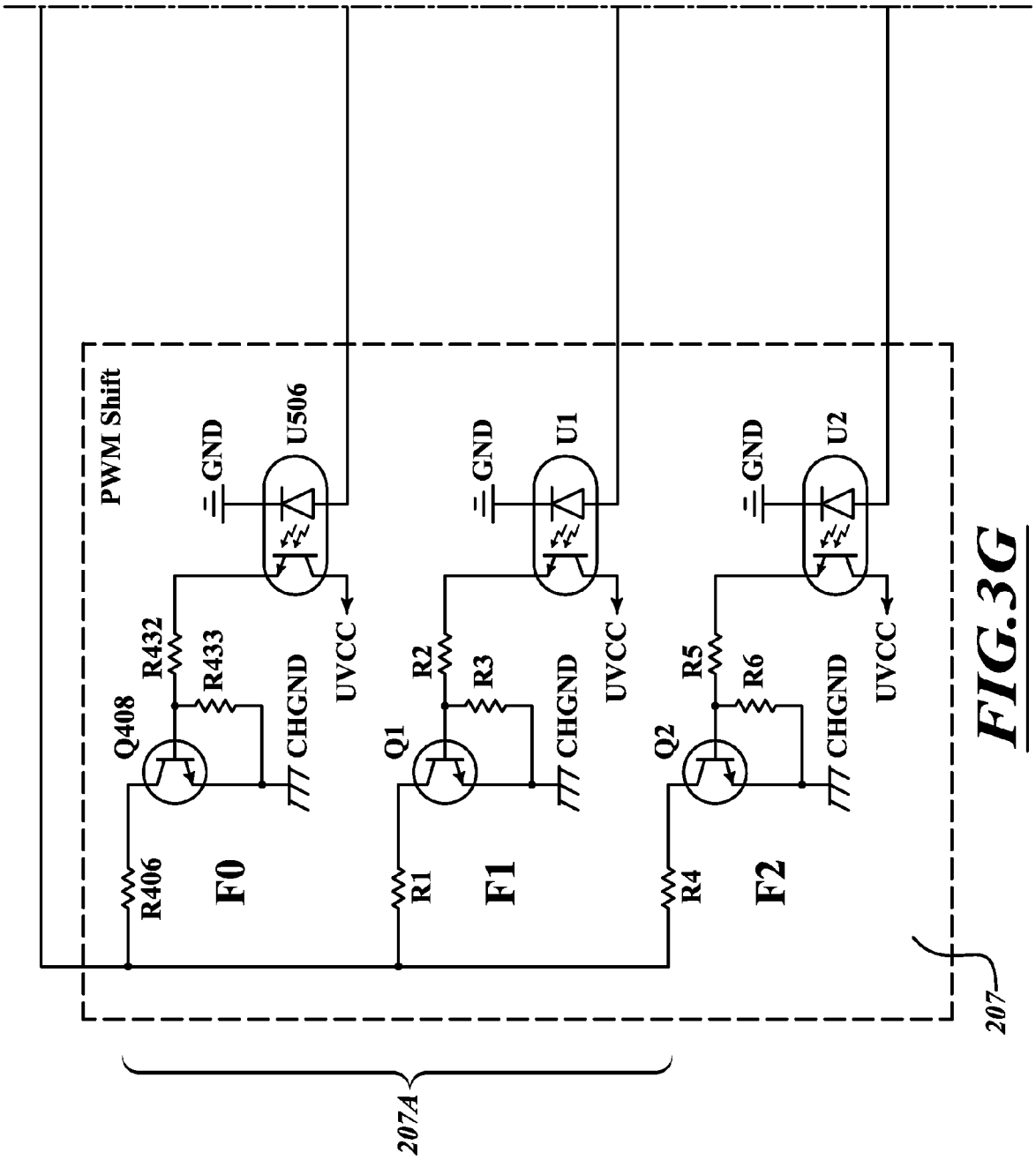
Figure 3H:
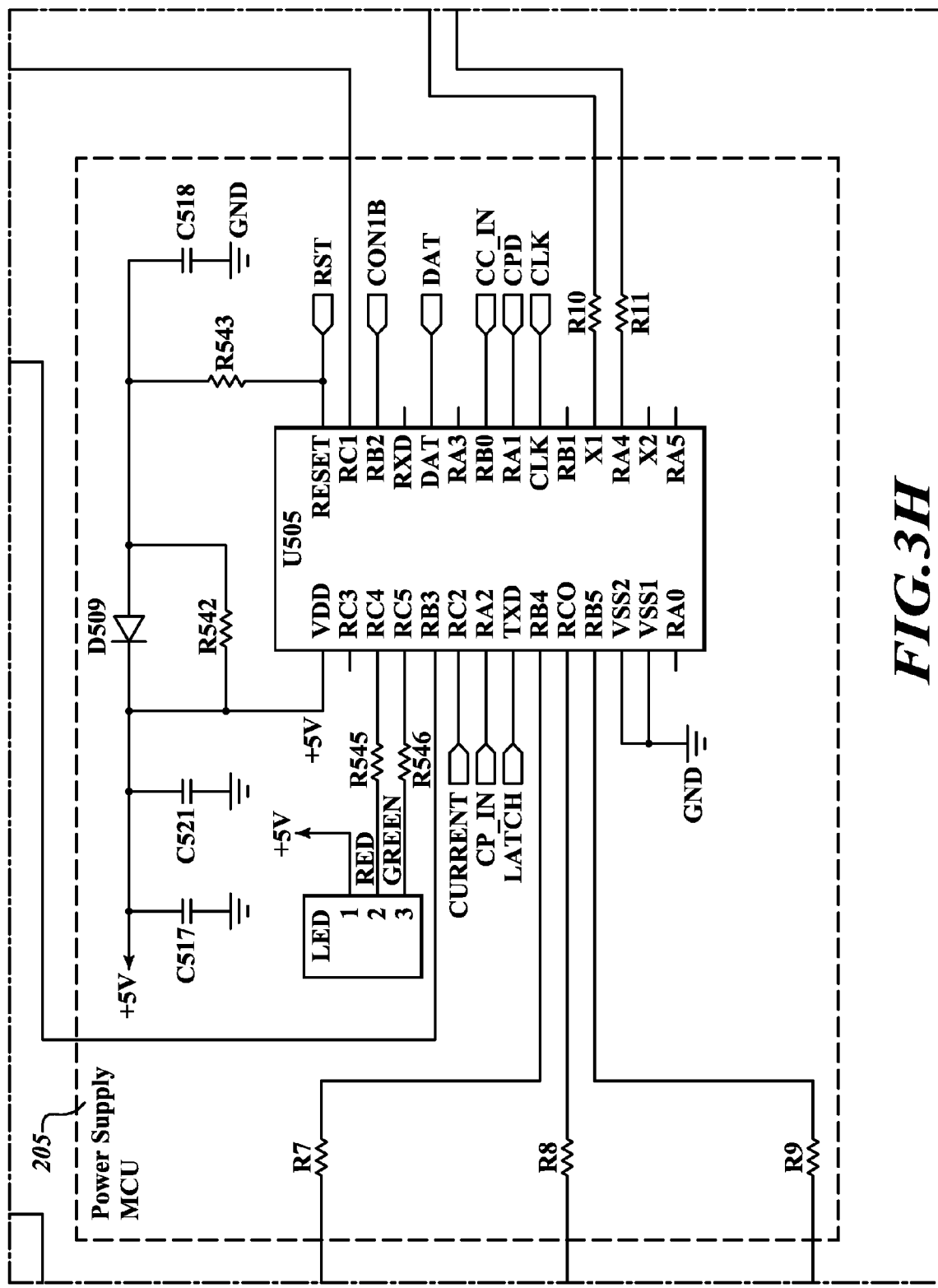
Figure 3I:
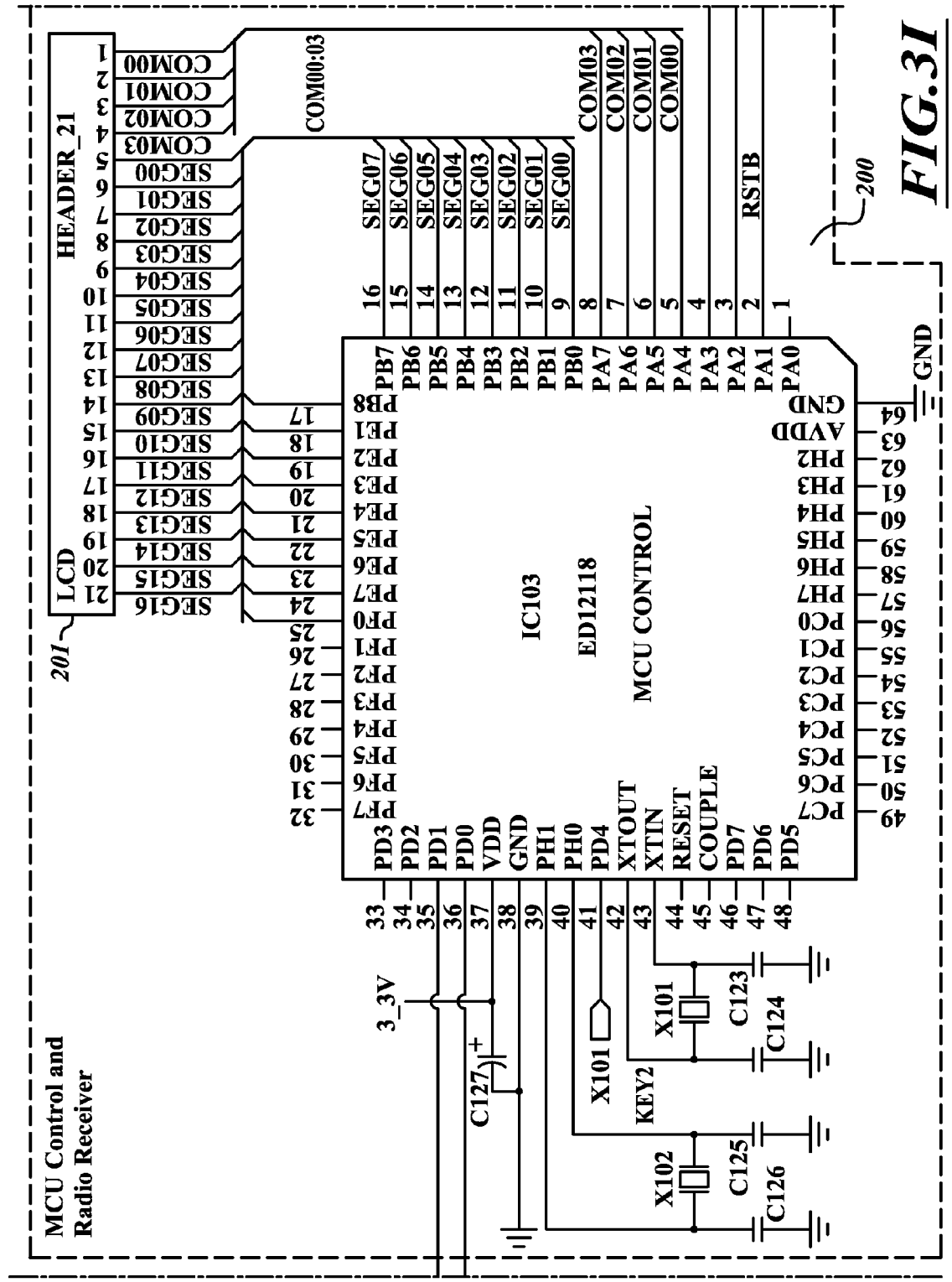
Figure 3J:
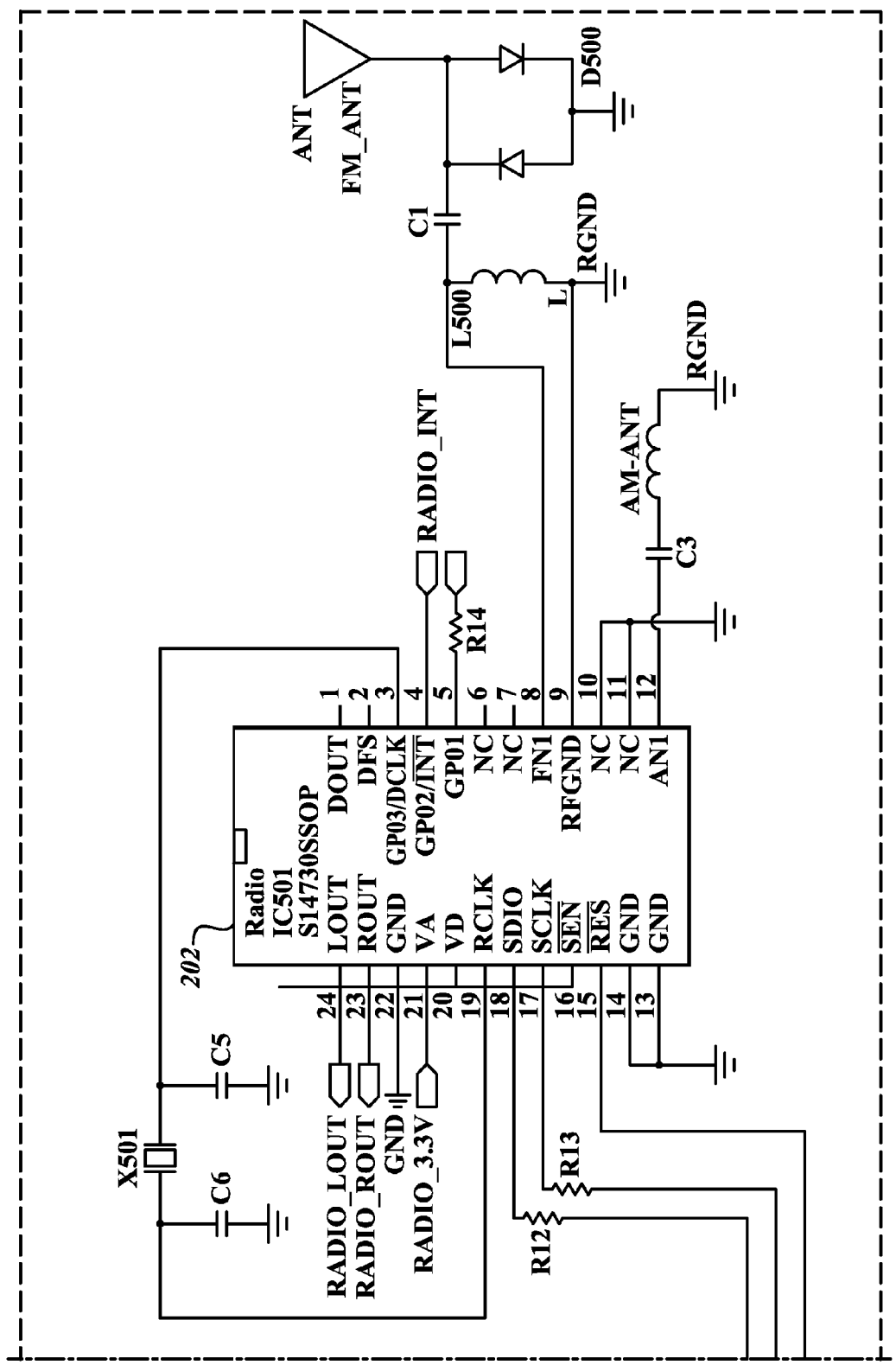

Referring now to Figs. 2A-2C, a functional block diagram of a preferred embodiment is shown in which the radio microcontroller (200) is provided for tuning in to selected AM/FM radio frequencies received via the radio receiver (202). The tuning of the radio can be effected by analogue tuning dial or can be digitally tuned. When tuned to a given radio frequency, the tuned radio frequency is displayed on the liquid crystal display (201) interconnected to the radio microcontroller (200), as shown.

When the radio microcontroller (200) tunes in to any given radio frequency, it is configured to calculate an operating frequency of the switched mode power supply (206) that will be set in order to alleviate electromagnetic interference of the switched mode power supply (206) with the tuned radio frequency of the radio. The step of detecting the tuned radio frequency is represented by block 101 in FIG. 1. In this embodiment, the switched mode power supply (206) is configured to be switched to at least one of 3 different operating frequencies $F_0$ (65 KHz), $F_1$ (67 KHz) or $F_2$ (69 KHz). The selection of either $F_0$, $F_1$, or $F_2$ as the operating frequency of the switched mode power supply (206) is determined based upon which of these possible operating frequencies and/or harmonic frequencies of these possible operating frequencies is furthest away from the tuned radio frequency. By way of example, and referring to the table in FIG. 4 of possible operating frequencies $F_0$, $F_1$, or $F_2$ (400) and their harmonics (401), if the radio microcontroller (200) were to be tuned to an AM band frequency of 1440 KHz, the operating frequency $F_1$ would be selected given that its harmonic (1407 KHz) is furthest away from that of the tuned frequency—that is, a gap of approximately 33 KHz, compared with harmonics of alternative operating frequencies $F_0$ and $F_2$. In contrast, the harmonic frequencies of $F_0$ and $F_2$ closest to the tuned frequency (i.e. 1430 KHz and 1449 KHz) respectively) are only separated from the tuned frequency by gaps of 23 KHz and 9 KHz, respectively. For ease of processing, the radio microcontroller (200) is pre-programmed with a look-up table of harmonics corresponding to the three possible operating frequencies $F_0$, $F_1$ and $F_2$ of the switched mode power supply (206) such that the radio microcontroller (200) can efficiently calculate the most suitable operating frequency of the switched mode power supply (206) in respect of each tuned radio frequency. It would be appreciated that a different number of possible operating frequencies can be selected from in alternative embodiments of the present invention however only 3 operation frequencies are utilised in this embodiment for illustrative purposes. The step of calculating an alternative operating frequency of the switched mode power supply which alleviates electromagnetic interference with the tuned radio frequency of the radio is represented by block 102 in FIG. 1.

When the operating frequency of the switched mode power supply (206) has been determined by the radio microcontroller (200), the radio microcontroller (200) outputs a data signal to a power supply and charger microcontroller (205) of the radio which is configured to set the operating frequency of the switched mode power supply (206). The data signal output by the radio microcontroller (200) is indicative of the switched mode power supply operating frequency from the options $F_0$, $F_1$, or $F_2$ which has been selected by the radio controller (200). Upon receiving the data signal, the power supply and charger microcontroller (205) is programmed to selectably turn on transistors $Q_3$, $Q_4$, or $Q_5$ (207A) whereby corresponding resistors $R_{15}$, $R_{18}$, or $R_{21}$ (207B) respectively are placed in parallel with a fixed input resistor R407 (206A) to the pulse width modulation switching circuit (206) which controls the operating frequency of the switched mode power supply (206). For instance, if operating frequency $F_0$ is to be set, then the power supply and charger microcontroller (205) will turn on transistor $Q_3$ which places resistor $R_{15}$ in parallel with the fixed input resistor R407 (206A) of the pulse width modulation switching circuit (206). The resulting parallel resistance that is formed at the input of the pulse width modulation switching circuit (206) determines which of the alternative operating frequency is set. The step of adjusting the operating frequency of the switched mode power supply (206) is represented by block 102 in FIG. 1.

Additional filtering inductors L501, L502, L602, L603, FL401, FL402 and FL403 (L) are provided as shown in the schematic circuit diagram FIGS. 3A-3J to assist in suppressing noise interference from cables, groundings and from the air. Additionally, the design of this preferred embodiment utilises a common switched mode power supply (206) to power both the radio and the internal rechargeable battery (208) which lends itself to better control of noise suppression of the switched mode power supply (206).

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

The invention claimed is:

1. A radio receiver for use in receiving radio signal frequencies in the public broadcasting standard spectrum, the radio receiver including:
   a switched mode power supply;
   a user input interface via which a user is able to select a radio signal frequency bandwidth to which the radio receiver is to be tuned; and
   a controller configured to, in response to the radio signal frequency bandwidth selected via the user input interface, shift an operating frequency of the switched mode power supply to a predetermined operating frequency before the radio receiver is tuned to the selected radio signal frequency bandwidth, whereby the predetermined operating frequency of the switched mode power supply is configured to alleviate electromagnetic interference arising with the selected radio signal frequency bandwidth to which the radio receiver is to be tuned.

2. A radio receiver as claimed in claim 1 wherein the controller includes a microcontroller of the radio receiver.

3. A radio receiver as claimed in claim 1 wherein the switched mode power supply includes a pulse width modulation switching circuit which controls the operating frequency of the switched mode power supply, and the predetermined operating frequency of the switched mode power supply is set by adjusting an operating characteristic of the pulse width modulation switching circuit.

4. A radio receiver as claimed in claim 1 wherein, in response to the radio signal frequency bandwidth selected via the user input interface, the controller is configured to shift the operating frequency of the switched mode power supply to one of a plurality of predetermined operating frequencies depending upon which of the plurality of predetermined operating frequencies and/or their harmonics are furthest away from the selected radio signal frequency bandwidth.

5. A radio receiver as claimed in claim 4 wherein the plurality of predetermined operating frequencies and their harmonics are programmed in to a lookup table accessible by the controller, and the controller is configured to shift the operating frequency to one of the plurality of predetermined operating frequencies by reference to the lookup table.

6. A radio receiver as claimed in claim 4 wherein the plurality of predetermined operating frequencies includes at least 3 predetermined operating frequencies.

7. A radio receiver as claimed in claim 1 wherein the radio receiver includes a portable AM/FM radio.

8. A radio receiver as claimed in claim 1 including a rechargeable battery, the rechargeable battery being powered by the switched mode power supply, and an output jack via which the rechargeable battery is able to charge-up an external device when the external device is electrically connected to the output jack.

9. A method of operating a radio receiver for use in receiving public broadcasting standard radio signal frequencies, the radio receiver including:
 a switched mode power supply;
 a user input interface; and
 a controller;
 wherein the method includes the steps of
  (i) selecting via the user input interface, a radio signal frequency bandwidth to which the radio receiver is to be tuned; and
  (ii) the controller, in response to the radio signal frequency bandwidth selected via the user input interface, shifting an operating frequency of the switched mode power supply to a predetermined operating frequency before the radio receiver is tuned to the selected radio signal frequency bandwidth;
 whereby the predetermined operating frequency of the switched mode power supply is configured to alleviate electromagnetic interference arising with the selected radio signal frequency bandwidth to which the radio receiver is to be tuned.

10. A method as claimed in claim 9 wherein controller includes a microcontroller of the radio receiver.

11. A method as claimed in claim 9 including a pulse width modulation switching circuit which controls the operating frequency of the switched mode power supply, and the predetermined operating frequency of the switched mode power supply is set by adjusting an operating characteristic of the pulse width modulation switching circuit.

12. A method as claimed in claim 9 wherein, in response to the radio signal frequency bandwidth selected via the user input interface, the controller is configured to shift the operating frequency of the switched mode power supply to one of a plurality of predetermined operating frequencies depending upon which of the plurality of predetermined operations frequencies and/or their harmonics are furthest away from the selected radio signal frequency bandwidth to which the radio receiver is to be tuned.

13. A method as claimed in claim 12 wherein the plurality of predetermined operating frequencies and their harmonics are programmed in to a lookup table accessible by the controller, and the controller is configured to shift the operating frequency to one of the plurality of predetermined operating frequencies by reference to the lookup table.

14. A method as claimed in claim 12 wherein the plurality of predetermined operating frequencies includes at least 3 predetermined operating frequencies.

15. A method as claimed in claim 9 wherein the radio receiver includes a portable AM/FM radio.

16. A method as claimed in claim 9 including a rechargeable battery, the rechargeable battery being powered by the switched mode power supply, and an output jack via which the rechargeable battery is able to charge-up an external device when the external device is electrically connected to the output jack.

17. A switched mode power supply for use with a radio receiver, the radio receiver including:
 a user input interface via which a user is able to select a radio signal frequency bandwidth to which the radio receiver is to be tuned; and
 a controller configured for shifting an operating frequency of the switched mode power supply to a predetermined operating frequency in response to the radio signal frequency bandwidth selected via the user input interface before the radio receiver is tuned to the selected radio signal frequency bandwidth, whereby the predetermined operating frequency of the switched mode power supply is configured to alleviate electromagnetic interference arising with the selected radio signal frequency bandwidth to which the radio receiver is to be tuned.

18. A switched mode power supply as claimed in claim 17 wherein the controller includes a microcontroller of the radio receiver.

19. A switched mode power supply as claimed in claim 17 wherein the switched mode power supply includes a pulse width modulation switching circuit which controls the operating frequency of the switched mode power supply, and the operating frequency of the switched mode power supply is configured to be shifted by adjusting an operating characteristic of the pulse width modulation switching circuit.

20. A switched mode power supply as claimed in claim 17 wherein, in response to the radio signal frequency bandwidth selected via the user input interface, the controller is configured to shift the operating frequency of the switched mode power supply to one of a plurality of predetermined operating frequencies depending upon which of the plurality of predetermined operating frequencies and/or their harmonics are furthest away from the selected radio signal frequency bandwidth to which the radio receiver is to be tuned.

21. A switched mode power supply as claimed in claim 20 wherein the plurality of predetermined operating frequencies and their harmonics are programmed in to a lookup table accessible by the controller, and the controller is configured to shift the operating frequency to one of the plurality of predetermined operating frequencies by reference to the lookup table.

22. A switched mode power supply radio as claimed in claim 20 wherein the plurality of predetermined operating frequencies includes at least three frequencies.

23. A switched mode power supply as claimed in claim 17 wherein the radio receiver includes a portable AM/FM radio.

24. A switched mode power supply as claimed in claim 17 including a rechargeable battery, the rechargeable battery being powered by the switched mode power supply, and an output jack via which the rechargeable battery is able to charge-up an external device when the external device is electrically connected to the output jack.

25. A method of operating a switched mode power supply for use with a radio receiver, the radio receiver being configured for receiving public broadcasting standard radio signal frequencies and including:
 a user input interface; and
 a controller;
 wherein the method includes the steps of (i) selecting via the user input interface, a radio signal frequency bandwidth to which the radio receiver is to be tuned; and (ii) the controller, in response to the radio signal frequency bandwidth selected via the user input interface, shifting an operating frequency of the switched mode power supply to a predetermined operating frequency before the radio receiver is tuned to the selected radio signal frequency bandwidth;

whereby the predetermined operating frequency of the switched mode power supply is configured to alleviate electromagnetic interference arising with the selected radio signal frequency bandwidth to which the radio receiver is to be tuned.

26. A method as claimed in claim 25 wherein the switched mode power supply includes a pulse width modulation switching circuit which controls the operating frequency of the switched mode power supply, and shifting the operating frequency of the switched mode power supply includes adjusting an operating characteristic of the pulse width modulation switching circuit of the switched mode power supply.

27. A method as claimed in claim 25 wherein, in response to the radio signal frequency bandwidth selected via the user input interface, the controller is configured to shift the operating frequency of the switched mode power supply one of a plurality of predetermined operating frequencies depending upon which of the plurality of predetermined operating frequencies and/or their harmonics are furthest away from the selected radio signal frequency to which the radio receiver is to be tuned.

28. A method as claimed in claim 27 predetermined operating frequencies and their harmonics are programmed in to a lookup table accessible by the controller, and the controller is configured to shift the operating frequency to one of the plurality of predetermined operating frequencies by reference to the lookup table.

29. A method as claimed in claim 27 wherein the plurality of predetermined operating frequencies includes at least 3 predetermined operating frequencies.

30. A method as claimed in claim 25 wherein the radio receiver includes a portable AM/FM radio.

* * * * *